United States Patent
Weig

(10) Patent No.: US 7,791,757 B2
(45) Date of Patent: Sep. 7, 2010

(54) PROCEDURE AND SYSTEM FOR THE PRODUCTION OF PHOTO BOOKS

(76) Inventor: Norbert Weig, Schwanderstrasse 11, Parkstein (DE)

( * ) Notice: Subject to any disclaimer, the term of this patent is extended or adjusted under 35 U.S.C. 154(b) by 1091 days.

(21) Appl. No.: 11/440,970

(22) Filed: May 25, 2006

(65) Prior Publication Data

US 2006/0268341 A1 Nov. 30, 2006

Related U.S. Application Data

(60) Provisional application No. 60/685,351, filed on May 27, 2005.

(51) Int. Cl.
*G06K 15/00* (2006.01)
*G06F 3/12* (2006.01)

(52) U.S. Cl. ................................. 358/1.18; 358/1.15

(58) Field of Classification Search ............... 358/1.1, 358/1.8, 1.9, 1.13, 1.15, 1.18, 302, 450, 468; 348/207.1, 207.99, 207.11, 207.2
See application file for complete search history.

(56) References Cited

U.S. PATENT DOCUMENTS

| | | | |
|---|---|---|---|
| 6,867,800 B1 * | 3/2005 | Fukasaka et al. | 348/207.1 |
| 7,330,286 B2 * | 2/2008 | Fukasawa | 358/1.9 |
| 7,382,405 B2 * | 6/2008 | Kusaka et al. | 348/231.6 |
| 7,508,424 B2 * | 3/2009 | Hayashi | 348/231.2 |
| 2003/0174213 A1 | 9/2003 | Matsumoto et al. | |
| 2005/0094014 A1 | 5/2005 | Haas et al. | |

FOREIGN PATENT DOCUMENTS

| | | |
|---|---|---|
| EP | 0860980 | 8/1998 |
| EP | 1491993 | 12/2004 |
| JP | 11355705 | 12/1999 |

* cited by examiner

*Primary Examiner*—Gabriel I Garcia
(74) *Attorney, Agent, or Firm*—Price, Heneveld, Cooper, DeWitt & Litton, LLP

(57) ABSTRACT

The present invention concerns a system or a procedure for the production of photograph albums, coffee-table books, albums and the like, with a mobile camera for recording and storing digital images, in which are integrated transmitting means for wireless remote radio transmission, an image-processing unit for manipulating and/or processing digital images with a receiver unit for receiving images transmitted by the camera and a printing device for printing out the images processed in the image-processing unit, with the image-processing unit and camera fitted out such that instructions for manipulating and/or processing the images are sent by the transmitting means of the camera to the image-processing unit directly.

12 Claims, 1 Drawing Sheet

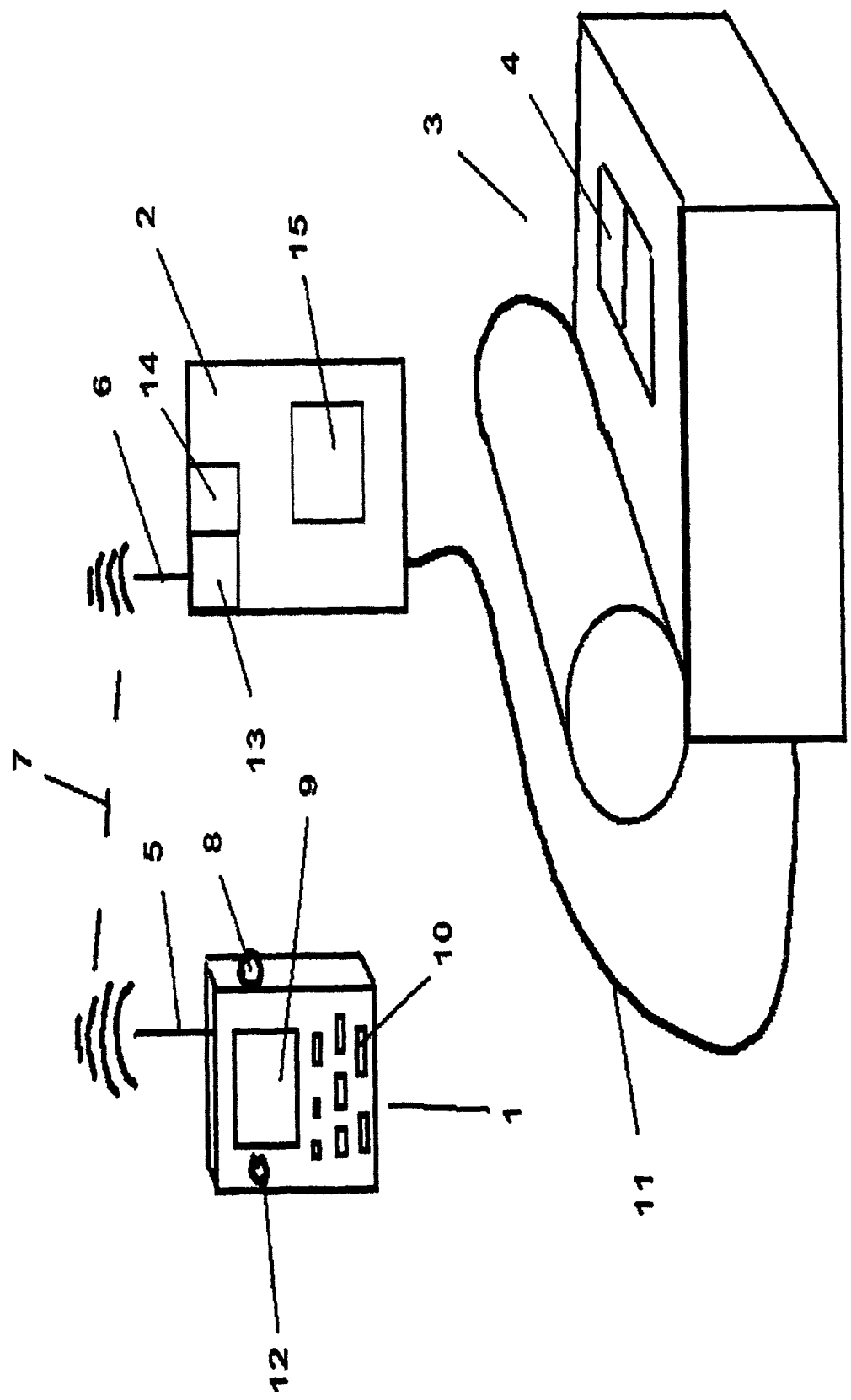

PROCEDURE AND SYSTEM FOR THE PRODUCTION OF PHOTO BOOKS

CROSS-REFERENCE TO RELATED APPLICATION

This application claims priority to U.S. Provisional Patent Application No. 60/685,351 filed May 27, 2005.

FIELD OF THE INVENTION

The present invention relates to a system and a procedure for the production of photo books.

BACKGROUND OF THE INVENTION

On account of the integration of cameras into mobile telephones, it is known from the prior art how to send digital images directly to a computer in a computer network, such as a webserver, on which the images can be stored.

Admittedly, with the known procedures and systems, it is necessary for a user who has stored images on a webserver to establish a connection with the server via a further computer attached to the network in order to further process and/or to transmit the images to an image service, which prints the images on photographic paper in order to produce copies for the user.

Usually, the images are then archived accordingly at the user's end, for example, stuck in photograph albums. However, this procedure is very time-consuming and inconvenient overall since several separate procedural steps are required.

SUMMARY OF THE INVENTION

It is therefore an object of the present invention to provide a procedure and a system with which rapid, effective and high-quality manipulation and/or processing of digital images through to corresponding archiving of the images are facilitated in a simple manner.

Cameras with corresponding transmitter and/or receiver units and mobile telephones with camera functions can be further formed and incorporated into a system such that it is possible for the user to use the mobile camera or a corresponding mobile camera telephone to exert overall control over the complete manipulation and/or processing. For this purpose, a printing device and a stationary image-processing unit are provided in the system that receive and further process the image data and the instructions of the user of the mobile camera or mobile camera telephone.

In this connection, it is possible for image manipulation and/or processing to take place wholly in the mobile camera or the stationary image-processing unit or be combined with partial image manipulation in the camera and partial image manipulation and processing occurring in the image-processing unit.

Correspondingly, both the camera and the image-processing unit are formed such that at least information can be transmitted from the camera to the image-processing unit. Transmission of communications data from the image-processing unit to the camera is additionally possible so as to be able to establish bidirectional communications, which, for example, facilitate successions of queries concerning corresponding information and instructions.

The camera and/or image-processing unit can be programmed such that they can perform the manipulation and/or processing or editing of the images. Aside from direct manipulation of the images with regard to brightness, contrast, color rendering, formatting and the like, composition, sorting and integration of the images into corresponding page layouts, book templates and the like are also provided. For this purpose, corresponding templates can be provided in the storage medium of the camera and/or the image-processing unit.

The image-processing unit or a part thereof can also be integrated in the printing device so that the images and additional information can be transmitted to the printing device directly. The printing device can additionally comprise devices for binding and/or cutting or be expanded with these.

The image-processing unit or a part thereof is a networked computer, with a processor, a storage medium and corresponding data-processing programs that are stored in the storage medium.

It is possible with the present invention to simply, by a radio-controlled camera or a mobile telephone equipped with a camera, create immediately and directly a coffee-table book or a photograph album that is printed, bound and/or produced in any other way at a remote location. In this way, it is possible to process and archive images immediately and directly in an appealing way, such that, for example, images of a holiday, a festivity or the like are available directly as a coffee-table book or photograph album after a short period. This can then, for example, be sent to the ordering party, so that the book is already waiting on their return from being away.

Further advantages, characteristics and features of the present invention are apparent from the following detailed description of an embodiment using the enclosed figure.

BRIEF DESCRIPTION OF THE DRAWINGS

FIG. 1 shows, in purely schematic form, an overview of a system of the invention for the production of photograph albums and the like.

DETAILED DESCRIPTION OF THE PREFERRED EMBODIMENT

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a mobile camera 1, which has a transmitter/receiver unit with an antenna 5, a keypad 10, a display 9, a microphone 12 and a lens 8.

The camera 1 has a processor (not shown) and a storage medium as well as, stored inside the storage medium, a data-processing program that controls the operation of the camera 1 and the interaction of the components of the camera 1. Via the data-processing program, the recording of digital images through the lens 8, temporary storing of the digital images in the memory, displaying of the images on the display 9 and editing of the images to modify the brightness, size, colors, etc. are possible. The data-processing program constitutes an editor, with the editing instructions capable of being entered via the keypad 10, the microphone 12 or the display 9, which can comprise a touchscreen. Through the agency of the editor provided by the data-processing program, it is also possible to carry out sorting of several images and insertion of the images into a pre-stored page layout.

Further, through the agency of the data-processing program of the camera 1, the transmitter and receiver unit is controlled such that, through the agency of the antenna 5, which can also be integrated into the housing of the camera 1, a remote radio link 7 can be established with an image-processing unit 2 via its antenna 6.

Via the remote radio link 7, not only the individual image data of the images recorded with the lens 8 but also the image data edited in the camera 1 can be transmitted. Further, via the remote radio link 7, additional information can be transmitted that take the form, for example, of legends, picture descriptions and the like. The additional information can also be entered via the keypad 10, the display 9 comprising the touch-screen or the microphone 12. Especially, it is advantageous here that the texts can be dictated and digitally recorded via the microphone 12.

The data received from the transmitter and receiver unit 13/14 via the antenna 6 are manipulated and/or processed in the image-processing unit 2 by submitting them simply via a data link 11 to the printing device 3 or further processed in a processing routine. To this end, a storage medium 15 is provided in order to facilitate intermediate storage of the data received from the camera 1.

A series of commands in the form of a data-processing program with which it is possible to manipulate and process the images that have been received from the camera 1 are also stored in the storage medium 15 inside the image processing unit 2. Processing in this regard can similarly comprise a modification of the individual images as regards brightness, format, contrast, color rendering as well as grouping and sorting of the images and fitting them into corresponding page layouts in accordance with corresponding templates, which can also be stored in the storage medium 15. In addition, the image-processing unit 2 can provide the images with additional information, such as picture descriptions, legends, etc., which the image-processing unit 2 has received from the camera 1 via the remote radio link 7.

To control the image-processing unit and the manipulation and/or processing of the digital images received from the camera 1, communications, controlled by the data-processing program, can take place with the camera 1 via the transmitter/receiver unit 13/14 such that the image-processing unit 2 transmits communications data to the camera 1 via the remote radio link 7, with the user requested to use the various input means 9, 10, 12 of the camera 1 to enter specific information, which is then received via the receiver unit 14 of the image-processing unit. The correspondingly processed data can then be transmitted via the data link 11 to the printing unit 3, so that this can print out the corresponding photograph album 4 or coffee-table books, albums, posters, calendars and the like, with additional equipment (separate or integrated) possibly provided for binding, cutting to size and the like. In the example, the image-processing unit 2 is shown as a separate unit. Aside from integration into the printing device 3 (wholly or partly), in a further preferred embodiment it can also be integrated largely as an editing means into the camera 1, with the manipulation unit assuming most of the control over the printing device or downstream processes. The finished photograph album 4 or general picture product can then be sent to the user of the mobile telephone 1 directly, with the mailing address and other data for processing the print order also transmitted via the camera 1 to the image-processing unit 2 directly. In this way, it is possible for the user of a mobile camera with a corresponding transmitter to send the images, immediately after recording them, via the image-processing unit 2 or, if this is integrated into the printing device 3, to the printing device 3 direct, so that, for example, the finished photo album is already waiting in the user's mailbox on their return from being away.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A system for the production of picture products comprising:
   a mobile camera for recording and storing of digital images, the camera having a wireless radio transmission unit;
   a stationary image-processing unit for manipulating and/or processing the digital images, the stationary image-processing unit comprising:
      a receiver unit for receiving images and instructions transmitted by the camera; and
      a transmitting unit for transmitting communications data to the camera, wherein the wireless radio transmission unit comprises a transmitter and a receiver for receiving communications data from the image-processing unit; and
   a printing device for printing out the digital images manipulated and/or processed in the image-processing unit;
   the stationary image-processing unit and camera being fitted out such that instructions for manipulating and/or processing the images are directly transmitted from the camera to the image-processing unit and communications data are sent from the stationary image-processing unit to the camera, so that mutual communications are established, the camera comprising an editor for editing recorded digital images, wherein the stationary image-processing unit and the editor of the camera for user-controlled image processing are provided such that, in the image-processing unit and by the editor in the camera, the images can be manipulated and/or processed and the image manipulation and/or processing occurs partly in the camera and partly in the stationary image-processing unit.

2. The system in accordance with claim 1, wherein:
   the wireless radio transmission unit comprises a mobile telephone.

3. The system in accordance with claim 1, wherein:
   the wireless radio transmission unit and the stationary image-processing unit are configured to transmit additional information.

4. The system in accordance with claim 1, wherein:
   the camera has an input and an output.

5. The system in accordance with claim 4, wherein:
   the input comprises an alphanumeric keypad, an input display and/or a microphone.

6. The system in accordance with claim 4, wherein:
   the output comprises a screen unit and/or a loudspeaker.

7. The system in accordance with claim 1, wherein:
   the image-processing unit is integrated into the printing device or connected to the printing device via a wireless or cabled data link.

8. The system in accordance with claim 1, wherein:
the camera and/or the image-processing unit comprises a storage unit for storing the digital images, templates and/or command sequences for manipulating and/or processing the digital images.

9. A method of producing image products comprising:
recording one or more digital images by a camera;
transmitting the digital images by remote radio link to a stationary image-processing unit;
printing out the digital images with a printing device; and
manipulating and/or processing of the digital images with the stationary image-processing unit;
wherein instructions for the stationary image-processing unit concerning manipulation and/or processing of the digital images occur directly by a transmission unit integrated into the camera and wherein communications data are sent from the stationary image-processing unit to the camera, such that mutual communications are established between the camera and stationary image-processing unit, and wherein user-controlled image processing takes place partly in the camera by an editor integrated in the camera and partly in the stationary image-processing unit, and wherein, in the stationary image-processing unit and by the editor in the camera, the images are manipulated and/or processed.

10. The method in accordance with claim 9, further including:
storing printing templates in the stationary image-processing unit and/or the camera.

11. The method in accordance with claim 9, further including:
entering instructions for manipulating and/or processing and/or editing and/or adding additional information into the camera via a keypad, input display and/or by voice input; and
transmitting the instructions for manipulating and/or processing and/or editing and/or adding additional information via a transmitter to the stationary image-processing unit.

12. The method in accordance with claim 9, further including:
outputting text or graphics on a display and/or an acoustic signal and/or voice output by a loudspeaker.

\* \* \* \* \*